Aug. 7, 1934.  E. A. FAGERLUND  1,969,641
SCREW CAP FOR ELECTRIC LAMPS
Original Filed Dec. 14, 1932
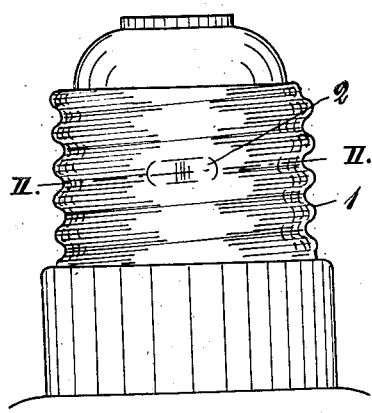
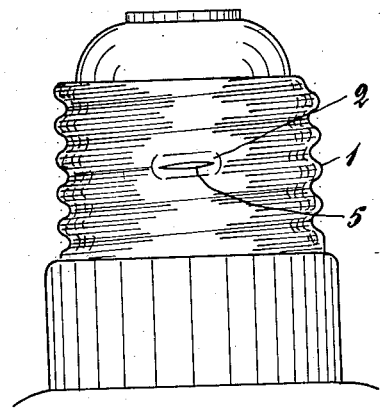
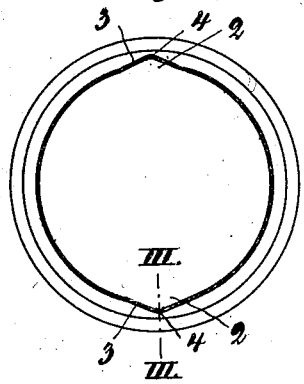
INVENTOR:
Erik A. Fagerlund Patented Aug. 7, 1934

1,969,641

UNITED STATES PATENT OFFICE 1,969,641

SCREW CAP FOR ELECTRIC LAMPS

Erik Artur Fagerlund, Lidingo Villastad, Sweden, assignor, by mesne assignments, of one-half to Aktiebolaget Nexum, Stockholm, Sweden Application December 14, 1932, Serial No. 647,232. Renewed July 2, 1934. In Germany December 22, 1931

1 Claim. (Cl. 176—31)

The present invention relates to an improvement in screw caps for electric lamps to be screwed into a threaded lamp socket.

The present invention has for its object to provide a novel and efficient device arranged on the screw caps of electric lamps by means of which a reliable connection will always automatically be established between the screw cap and the socket, and which at the same time is very simple and exceedingly cheap to produce.

Thus, the invention relates to a device for locking the connection between the screw cap and the socket which is characterized therein that one or a plurality of outwardly directed projections are made in the bottom of the thread of the screw cap, which projections are of such a nature that when the lamp is screwed into the socket, said projection or projections are de-formed, at least partly elastically, so as to give rise to a lasting pressure and thereof resulting friction, which holds the cap and the socket locked together.

Three forms of the invention are illustrated by way of example in the accompanying drawing.

Fig. 1 is an elevation of a screw cap according to the invention, Fig. 2 is a section along the line II—II in Fig. 1.

Fig. 3 is a section along the line III—III in Fig. 2.

Fig. 4 is a plan view of a modified form of the projection.

Fig. 5 is a cross section through a second modification of the projection.

In Figs. 1-3, 1 designates a metal screw cap for electric incandescent lamps of the common standard form, with the exception that according to the invention one or a plurality of hollow resilient projections 2 are arranged in the bottom of the thread. On the drawing two such projections are shown, arranged diametrically opposite each other. However, the invention is not limited as to any certain number of such projections.

When screwing the cap into the socket thereby deforming the projections, at least partly elastically, a wedge action occurs between the top of the thread in the socket and the sloping side of the projection.

The projections are formed by pressing the material of the screw cap outwards from the inside of the cap. It is given an elongated shape in the longitudinal direction of the thread, and preferably of an angular section as clearly shown in Fig. 2, so as to form two sides 3 and an apex 4.

In Fig. 2 is shown by dashed and dotted lines the appearance of the thread before pressing out the projection as compared with the projection 2 shown with full lines.

By giving the projection 2 the hollow elongated, angular form shown in Fig. 2, the apex part 4 will always be easily deformed when screwing the cap into the socket, even when the difference of their diameters are considerable, or if they fit very closely together.

The projections can be produced at the same time as the thread of the screw cap, and all that is needed is a corresponding alteration of the dies. Thus, it is evident that the cost of producing said projections will amount to practically nothing.

Further, the screw cap can be screwed into sockets of any kind of material, even brittle material, such as porcelain, bakelite and the like, on account thereof that no deformation of the lamp holder is needed to secure the connection with the screw cap. Only the projections themselves are deformed for this purpose.

A screw cap provided with one or several such projections can be screwed into and unscrewed any number of times, without losing its locking action or damaging the lamp holder.

In order to make the deformation still easier, I have in Fig. 4 shown a modification according to which a longitudinal slit 5 is made in the projection 2.

In another modification shown in Fig. 5, I have for the same purpose made the surface 6 of the projection corrugated.

Having now particularly described my invention and manner of its operation, I declare that what I claim is:

In screw caps for electric lamps to be screwed into threaded lamp sockets, a device for locking the cap in the socket and securing the electrical contact between said members, consisting in at least one hollow resilient projection from the bottom of the thread of the screw cap, said projection being, in the longitudinal direction of the thread, of an elongated shape and provided with a sloping side adapted to be pressed with wedge action against the bottom of the thread of the socket, when the lamp is screwed into the socket, and to effect locking by friction due to elastic deformation of said projection.

ERIK ARTUR FAGERLUND.